United States Patent
Layouni et al.

(10) Patent No.: US 10,951,607 B2
(45) Date of Patent: Mar. 16, 2021

(54) AUTHENTICATION METHODS AND SYSTEMS

(71) Applicant: GM GLOBAL TECHNOLOGY OPERATIONS LLC, Detroit, MI (US)

(72) Inventors: Mohamed A. Layouni, Warren, MI (US); Thomas M. Forest, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 137 days.

(21) Appl. No.: 16/213,463

(22) Filed: Dec. 7, 2018

(65) Prior Publication Data
US 2019/0349349 A1 Nov. 14, 2019

Related U.S. Application Data

(63) Continuation-in-part of application No. 15/978,641, filed on May 14, 2018.

(51) Int. Cl.
*H04L 29/06* (2006.01)
*H04L 9/06* (2006.01)

(52) U.S. Cl.
CPC .......... *H04L 63/083* (2013.01); *H04L 9/0643* (2013.01)

(58) Field of Classification Search
CPC .............................. H04L 63/083; H04L 9/0643
See application file for complete search history.

(56) References Cited

U.S. PATENT DOCUMENTS

| | | | |
|---|---|---|---|
| 6,553,494 B1 | 4/2003 | Glass | |
| 2007/0025598 A1* | 2/2007 | Kobayashi | G06K 9/0061 382/117 |
| 2008/0209226 A1 | 8/2008 | Venkatesan | |
| 2017/0076639 A1* | 3/2017 | Yasuda | G09C 1/00 |
| 2018/0093641 A1 | 4/2018 | Decke et al. | |

\* cited by examiner

*Primary Examiner* — Malcolm Cribbs
*Assistant Examiner* — Stephanie S Ham
(74) *Attorney, Agent, or Firm* — Lorenz & Kopf, LLP

(57) ABSTRACT

Authentication methods, systems and computer readable storage medium are provided. In an embodiment, an authentication method includes obtaining from an authentication template a first template portion, including an encoding of features, and a second template portion, including an identification of a location in the first template portion that is not usable. The method further includes revising the first template portion by setting a value at the location to a selected value to form a revised first template portion. Also, the method includes creating an authentication codeword from the revised first template portion and from public recovery data. The method further includes performing an error correction process to generate a corrected authentication codeword from the authentication codeword and from the second template portion and decoding the corrected authentication codeword.

20 Claims, 4 Drawing Sheets

AUTHENTICATION METHODS AND SYSTEMS

INTRODUCTION

Generally, security systems employ an identity-based authentication scheme to verify the identity of a user before granting access to an access-controlled resource. One goal of such security systems is to accurately determine identity so that an unauthorized party cannot gain access. Security systems can use one or more of several factors, alone or in combination, to authenticate users. For example, identification systems can be based on something that the user knows, something the user is, or something that the user has.

In certain applications, the security system may obtain information from the user in image form through a camera or other image capture device. The information may be in the form of biometric data. Biometric information is metric related data based on human features or characteristics, such as features or characteristics of fingerprints, faces, irises, retinas, hands and voices. Such biometric information can be used to authenticate the identity of an individual. The authentication can be used for a variety of reasons, for example, granting access to a door, a phone, a computing system, a bank account, or the like. Biometric information is personal information that an individual typically does not want others to obtain for many reasons, including for privacy concerns.

In certain conditions, an image may include portions that are not usable, i.e., cannot be properly encoded. For example, the image may include blurry, blocked or occluded portions of the desired features.

Accordingly, it is desirable to provide biometric authentication methods and systems that reliably and accurately process images of features despite portions of the image being not usable. Furthermore, other desirable features and characteristics will become apparent from the subsequent detailed description and the appended claims, taken in conjunction with the accompanying drawings and the introduction.

SUMMARY

Authentication methods, systems and computer readable storage medium are provided, as well as methods, systems and computer readable storage medium for privacy-enhanced biometric access. In an embodiment, an authentication method includes obtaining from an authentication template a first template portion, including an encoding of features, and a second template portion, including an identification of locations in the first template portion that are not usable. The method further includes revising the first template portion by setting a value at the location to a selected value to form a revised first template portion. Also, the method includes creating an authentication codeword from the revised first template portion and from public recovery data. The method further includes performing an error correction process to generate a corrected authentication codeword from the authentication codeword and from the second template portion and decoding the corrected authentication codeword.

In the authentication method, decoding the corrected authentication codeword may generate an authentication input. Further, in the authentication method, the public recovery data may be generated from an enrollment input that is converted by a hash function to an enrollment hashed value. The authentication method may further include inputting the authentication input to the hash function to convert the authentication input to an authentication hashed value. Also, the authentication method may further include comparing the authentication hashed value to the enrollment hashed value. In further embodiments, the authentication method may include authenticating a user when the authentication hashed value is identical to the enrollment hashed value. Also, in certain embodiments, the method may include communicating and/or recording a record of each instance a user is authenticated.

In some embodiments, creating the authentication codeword from the revised first template portion and from public recovery data includes processing the revised authentication encoding and the recovery data with a bitwise operator processing unit.

In certain embodiments, creating the authentication codeword from the revised first template portion and from public recovery data comprises processing the revised authentication encoding and the recovery data with an exclusive OR (XOR) processing unit.

Also, in some embodiments, revising the first template portion by setting the value at the location to the selected value to form the revised first template portion includes setting the value at the location to zero.

In another embodiment, an authentication method includes obtaining an enrollment encoding of features from a user, wherein the enrollment encoding includes a first set of occlusions at a first set of locations. The method includes setting a value at the first set of locations to a selected value to create a revised enrollment encoding, and processing the revised enrollment encoding and an enrollment codeword to create a blinded enrollment encoding as recovery data. Further, the method includes obtaining an authentication encoding of features from the user, wherein the authentication encoding includes the first set of locations and includes a second set of occlusions at a second set of locations. The authentication method also includes setting the value at the first set of locations of the authentication template to the selected value to create a revised authentication encoding. Further, the authentication method includes processing the revised authentication encoding and the recovery data to create an authentication codeword, and comparing the authentication codeword and the enrollment codeword to authenticate the user.

In certain embodiments, the method creates the enrollment codeword by encoding an enrollment input, such as a random value. The method may further include entering the enrollment input (random value) in a hash function and converting the enrollment input (random value) to an enrollment hashed value.

Also, in the method, comparing the authentication codeword and the enrollment codeword to authenticate the user may include: decoding the authentication codeword to generate an authentication input; entering the authentication input in the hash function and converting the authentication input to an authentication hashed value; and authenticating the user when the authentication hashed value is identical to the enrollment hashed value.

In some embodiments of the authentication method, processing the revised enrollment encoding and the enrollment codeword to create the blinded enrollment encoding as recovery data includes processing the revised enrollment encoding and the enrollment codeword with a first bitwise operator processing unit, such as a first exclusive OR (XOR) processing unit, and processing the revised authentication encoding and the recovery data to create the authentication codeword includes processing the revised authentication encoding and the recovery data to create the authentication codeword with a second bitwise operator processing unit, such as a second exclusive OR (XOR) processing unit.

In certain embodiments of the authentication method, setting the value at the first location to the selected value to create the revised enrollment encoding comprises setting the value at the first location to zero. Further, in certain embodiments of the authentication method, setting the value at the first location to the selected value create the revised authentication encoding further includes setting the value at the second location of the authentication template to the selected value.

In some embodiments, the authentication method further includes communicating and/or recording a record of each authentication of the user.

In another embodiment, a non-transitory computer readable storage medium having program instructions embodied therewith is provided. The program instructions are readable by a processor to cause the processor to perform a method for authenticating a user including: receiving an authentication input associated with the user, wherein the authentication input has a first template portion, including an encoding of features, and a second template portion, including an identification of a location in the first template portion that is not usable; revising the first template portion by setting a value at the location to a selected value to form a revised first template portion; creating an authentication codeword from the revised first template portion and from public recovery data; performing an error correction process to generate a corrected authentication codeword from the authentication codeword and from the second template portion; and decoding the corrected authentication codeword.

In an embodiment, a method for providing privacy-enhanced biometric access includes receiving, by a central processor, a biometric token request associated with a request for access rights by a user. The biometric token request includes a hashed value of an enrollment input, and a blinded version of a first portion of an enrollee biometric template. The method for providing privacy-enhanced biometric access further includes generating, by the central processor, a signed token from the hashed value and the blinded version of the first portion of the enrollee biometric template.

The method may further include sending, by the central processor, the signed token to an access control entity or to a user computing device for conveyance to the access control entity. In certain embodiments, the access control entity is a vehicle.

In an exemplary embodiment, the blinded version of the first portion of the enrollee biometric template is an exclusive OR (XOR) value of the first portion of the enrollee biometric template and an enrollment codeword derived from the enrollment input.

Further, the biometric token request may include a second portion of the enrollee biometric template specifying parts of the first portion of the enrollee biometric template that are occluded. In such embodiments, generating the signed token includes generating the signed token from the hashed value, the blinded version of the first portion of the enrollee biometric template, the second portion of the enrollee biometric template, and metadata describing conditions for use after access.

In some embodiments, the method for providing privacy-enhanced biometric access further includes selecting, by a user processor, the enrollment input; encoding, by the user processor, the enrollment input to generate the enrollment codeword; and generating, by the user processor, the blinded version of the first portion of the enrollee biometric template from the enrollment codeword and the first portion of the enrollee biometric template. Further, in such embodiments, encoding the enrollment input to generate the enrollment codeword may include applying an error correction code to the enrollment input.

In certain embodiments, applying the error correction code to the enrollment input includes applying a first error correction code to the enrollment input and obtaining a first output, and applying a second error correction code to the first output to generate the enrollment codeword. In exemplary embodiments, applying the error correction code to the enrollment input may include generating an error correction code output, and permuting the error correction code output by interleaving. In certain embodiments, the error correction code is an erasure code.

An exemplary method further includes receiving, by the access control entity, a first portion of an authentication biometric template and the blinded version of the first portion of the enrollee biometric template; generating, by the access control entity, an authentication codeword from the first portion of the authentication biometric template and the blinded version of the first portion of the enrollee biometric template; decoding, by the user processor, the authentication codeword to generate an authentication input; verifying, by the user processor, that the authentication biometric template and the enrollee biometric template match by computing a cryptographic hash of the authentication input and verifying that the output of the hash function is the same as a corresponding hashed value in the signed token; and allowing, by the user processor, the user access to the access control entity when the authentication biometric template and the enrollee biometric template match. In such embodiments, verifying that the authentication biometric template and the enrollee biometric template match may include utilizing occlusion information from the enrollment biometric template and occlusion information from the authentication biometric template to determine error locations where occlusions occur in the authentication biometric template but do not occur in the enrollee biometric template.

In another embodiment, a system for privacy-enhanced biometric access is provided. The system includes a user processor, wherein the user processor selects an enrollment input, generates a hashed value of the enrollment input, encodes the enrollment input to generate an enrollment codeword, receives enrollment biometric data from a user, and generates a blinded version of a first portion of the enrollee biometric template from the enrollment codeword and the enrollee biometric template. The system further includes a central processor, wherein the central processor receives from the user processor a biometric token request associated with a request for access rights by a user, wherein the biometric token request comprises the hashed value of the enrollment input and the blinded version of the first portion of the enrollee biometric template, and wherein the central processor generates a signed token from the hashed value and the blinded version of the first portion of the enrollee biometric template.

In certain embodiments, the system further includes an access control entity, wherein the access control entity receives the signed token from the central processor. In certain embodiments, the user processor or the access control entity: receives authentication biometric data from a user and generates an authentication codeword from a first portion of the authentication biometric template and the blinded version of the first portion of the enrollee biometric template; decodes the authentication codeword to generate an authentication input; verifies that the authentication biometric template and the enrollee biometric template match; and allows, the user access to the access control entity when the user biometric template and the enrollee biometric template match.

In an exemplary system for privacy-enhanced biometric access, the biometric token request further includes a second portion of the enrollee biometric template specifying parts of the first portion of the enrollee biometric template that are occluded, and the central processor generates the signed token from the hashed value, the blinded version of the first portion of the enrollee biometric template, the second portion of the enrollee biometric template, and metadata describing conditions for use after access.

Another exemplary system for privacy-enhanced biometric access further includes an access control entity, wherein the access control entity receives the signed token from the central processor, wherein the enrollment biometric data includes a second portion of the enrollment biometric data specifying parts of the first portion of the enrollee biometric template that are occluded, and wherein the user processor or the access control entity verifies that the authentication biometric template and the enrollee biometric template match.

Another embodiment provides a non-transitory computer readable storage medium having program instructions embodied therewith. The program instructions are readable by a processor to cause the processor to perform a method for privacy-enhanced biometric access including receiving a biometric token request associated with a request for access rights by a user, wherein the biometric token request comprises a hashed value of an enrollment input and a blinded version of a first portion of an enrollee biometric template; and generating a signed token from the hashed value and the blinded version of the first portion of the enrollee biometric template. The method may further include sending the signed token to an access control entity or to a user computing device for conveyance to the access control entity.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present subject matter will hereinafter be described in conjunction with the following drawing figures, wherein like numerals denote like elements, and wherein.

DETAILED DESCRIPTION

Figure 1:
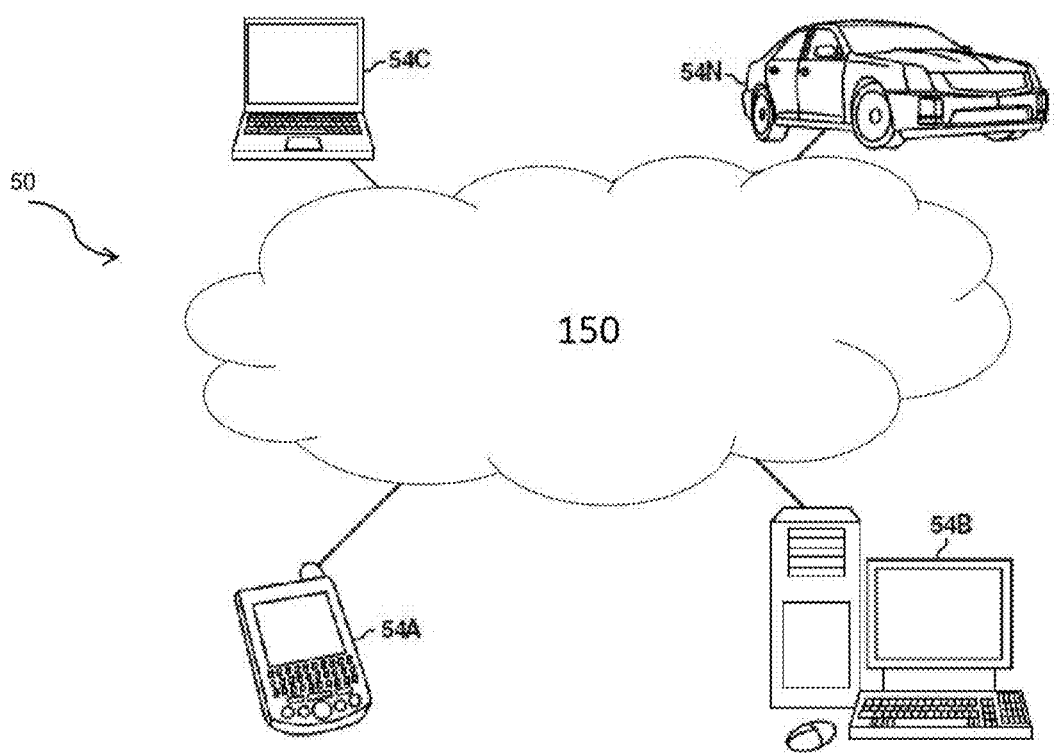
FIG. 1 is a computing environment in accordance with embodiments herein.

The following detailed description is merely illustrative in nature and is not intended to limit the embodiments of methods, systems and computer readable storage medium for privacy-enhanced biometric access described herein. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Embodiments herein may be described below with reference to schematic or flowchart illustrations of methods, systems, devices, or apparatus that may employ programming and computer program products. It will be understood that blocks, and combinations of blocks, of the schematic or flowchart illustrations, can be implemented by programming instructions, including computer program instructions. These computer program instructions may be loaded onto a computer or other programmable data processing apparatus (such as a controller, microcontroller, or processor) to produce a machine, such that the instructions which execute on the computer or other programmable data processing apparatus create instructions for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks. Programming instructions may also be stored in and/or implemented via electronic circuitry, including integrated circuits (ICs) and Application Specific Integrated Circuits (ASICs) used in conjunction with sensor devices, apparatuses, and systems.

Described herein is a biometric authentication scheme that does not require the enrollee to send his biometric information to the back office or central database/processor, which would otherwise represent a privacy risk. Nor does the scheme require the enrollee to store a copy of his enrollment biometric or any biometric token on a local device such as a phone, which would otherwise represent a security risk as the device can be compromised. In fact, embodiments of the biometric authentication scheme do not require any secure storage capabilities on the user's phone. Moreover, the enrollee does not need to communicate anything to the authenticating device other than providing biometric data, such as by displaying his iris. Thus, embodiments of the biometric authentication scheme prevent leaking of users' biometric information, which may otherwise lead to long-term and permanent cybersecurity problems, such as identify theft, impersonation, etc.

Further, embodiments of the scheme described herein are capable of overcoming issues presented by occlusions, such as those caused by eyelids covering portions of the iris or specular reflections, that are prevalent in iris-based authentication. Moreover, the angular orientations of the iris during enrollment and authentication phases are often different. This adds challenges to authentication processes. Described herein are techniques to provide for authentication despite differing angular orientations during enrollment and authentication. Thus, despite occlusions and despite the fact that any two measurements of the same biometric will be different to some extent, embodiments of the scheme described herein are able to correctly accept measurements from the same biometric and reject others, all while preserving the privacy of the enrollment biometric.

Embodiments may utilize the authentication methods and systems and/or the methods and systems for providing biometric access in a variety of applications. For example, such methods and systems may be utilized in automobile sharing applications and/or in personal vehicles to provide vehicle access and start. Such applications may utilize the methods and systems described herein as the primary access mode, or as a backup mode. Also, the methods and systems described herein may be utilized to provide temporary authorizations to use a vehicle, such as by a vehicle owner to family or friends. Further, the methods and systems may be used in a peer-to-peer (P2P) car sharing arrangement. In other embodiments, the methods and systems described may be utilized for in-vehicle payments—such as for tolls, parking or drive-through purchases. In-car delivery can also be provided by allowing access for delivery according to methods and systems described herein. Also, valet access can be provided utilizing the methods and systems described herein. Additional operating constraints such as geofencing and maximum speed can also be specified in valet access mode.

In accordance with an exemplary embodiment, FIG. 1 illustrates a computing environment 50. As shown, computing environment 50 comprises one or more computing devices, for example, personal digital assistant (PDA) or cellular telephone (mobile device) 54A, server 54B, computer 54C, and/or automobile onboard computer system 54N, which are connected via network 150. The one or more computing devices may communicate with one another using network 150.

Network 150 can be, for example, a local area network (LAN), a wide area network (WAN), such as the Internet, a dedicated short range communications network, or any combination thereof, and may include wired, wireless, fiber optic, or any other connection. Network 150 can be any combination of connections and protocols that will support communication between mobile device 54A, server 54B, computer 54C, and/or automobile onboard computer system 54N, respectively.

Figure 2:
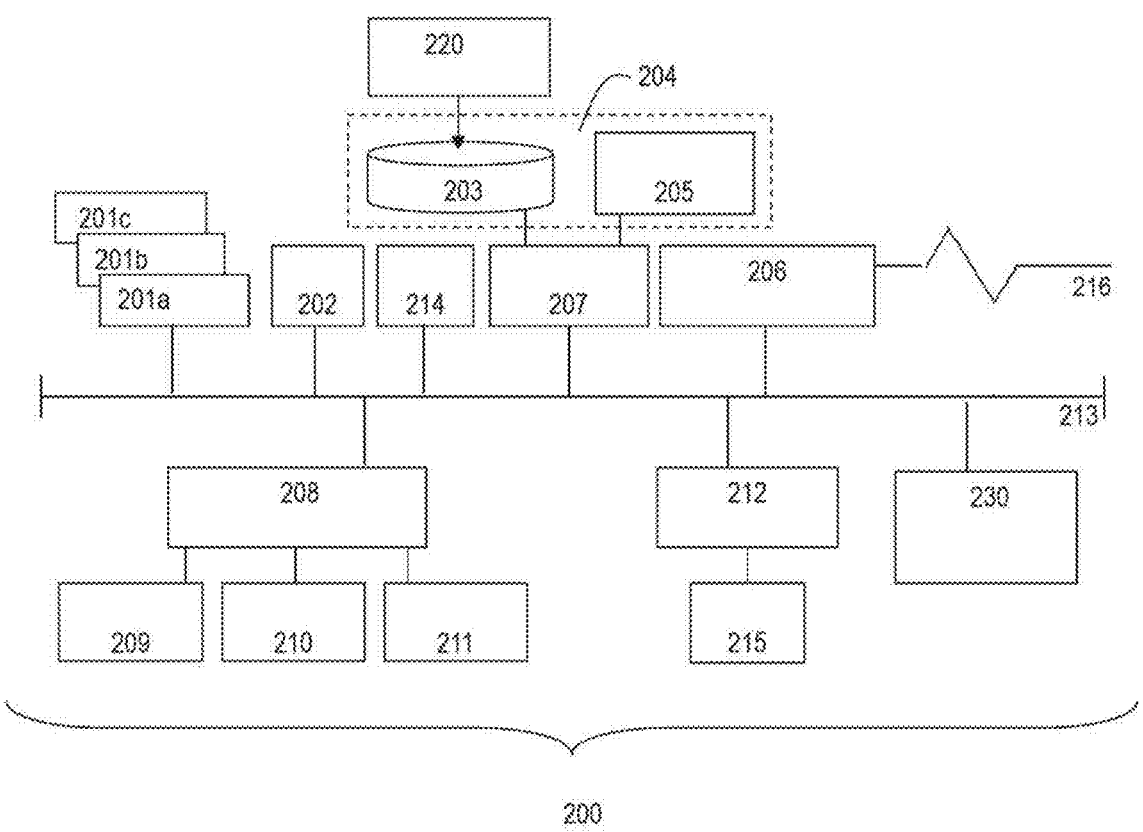
FIG. 2 is a block diagram illustrating an example of a processing system for practice of teachings herein.

In accordance with an exemplary embodiment, FIG. 2 illustrates a processing system 200 for implementing the teachings herein. The processing system 200 can form at least a portion of the one or more computing devices, such as mobile device 54A, server 54B, computer 54C, and/or automobile onboard computer system 54N. The processing system 200 may include one or more central processing units (processors) 201a, 201b, 201c, etc. (collectively or generically referred to as processor(s) 201). Processors 201 are coupled to system memory 214 and various other components via a system bus 213. Read only memory (ROM) 202 is coupled to the system bus 213 and may include a basic input/output system (BIOS), which controls certain basic functions of the processing system 200.

FIG. 2 further depicts an input/output (I/O) adapter 207 and a network adapter 206 coupled to the system bus 213. I/O adapter 207 may be a small computer system interface (SCSI) adapter that communicates with a hard disk 203 and/or other storage drive 205 or any other similar component. I/O adapter 207, hard disk 203, and other storage device 205 are collectively referred to herein as mass storage 204.

Operating system 220 for execution on the processing system 200 may be stored in mass storage 204. A network adapter 206 interconnects bus 213 with an outside network 216 enabling data processing system 200 to communicate with other such systems. A screen (e.g., a display monitor) 215 can be connected to system bus 213 by display adaptor 212, which may include a graphics adapter to improve the performance of graphics intensive applications and a video controller. In one embodiment, adapters 207, 206, and 212 may be connected to one or more I/O busses that are connected to system bus 213 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 213 via user interface adapter 208 and display adapter 212. A keyboard 209, mouse 210, and speaker 211 can all be interconnected to bus 213 via user interface adapter 208, which may include, for example, a Super I/O chip integrating multiple device adapters into a single integrated circuit.

The processing system 200 may additionally include a graphics processing unit 230. Graphics processing unit 230 is a specialized electronic circuit designed to manipulate and alter memory to accelerate the creation of images in a frame buffer intended for output to a display. In general, graphics-processing unit 230 is very efficient at manipulating computer graphics and image processing and has a highly parallel structure that makes it more effective than general-purpose CPUs for algorithms where processing of large blocks of data is done in parallel.

Thus, as configured in FIG. 2, the processing system 200 includes processing capability in the form of processors 201, storage capability including system memory 214 and mass storage 204, input means such as keyboard 209 and mouse 210, and output capability including speaker 211 and display 215. In one embodiment, a portion of system memory 214 and mass storage 204 collectively store an operating system to coordinate the functions of the various components shown in FIG. 2.

The one or more computing devices may further include a transmitter and receiver (not shown), to transmit and receive information. The signals sent and received may include data, communication, and/or other propagated signals. Further, it should be noted that the functions of transmitter and receiver could be combined into a signal transceiver.

Figure 3:
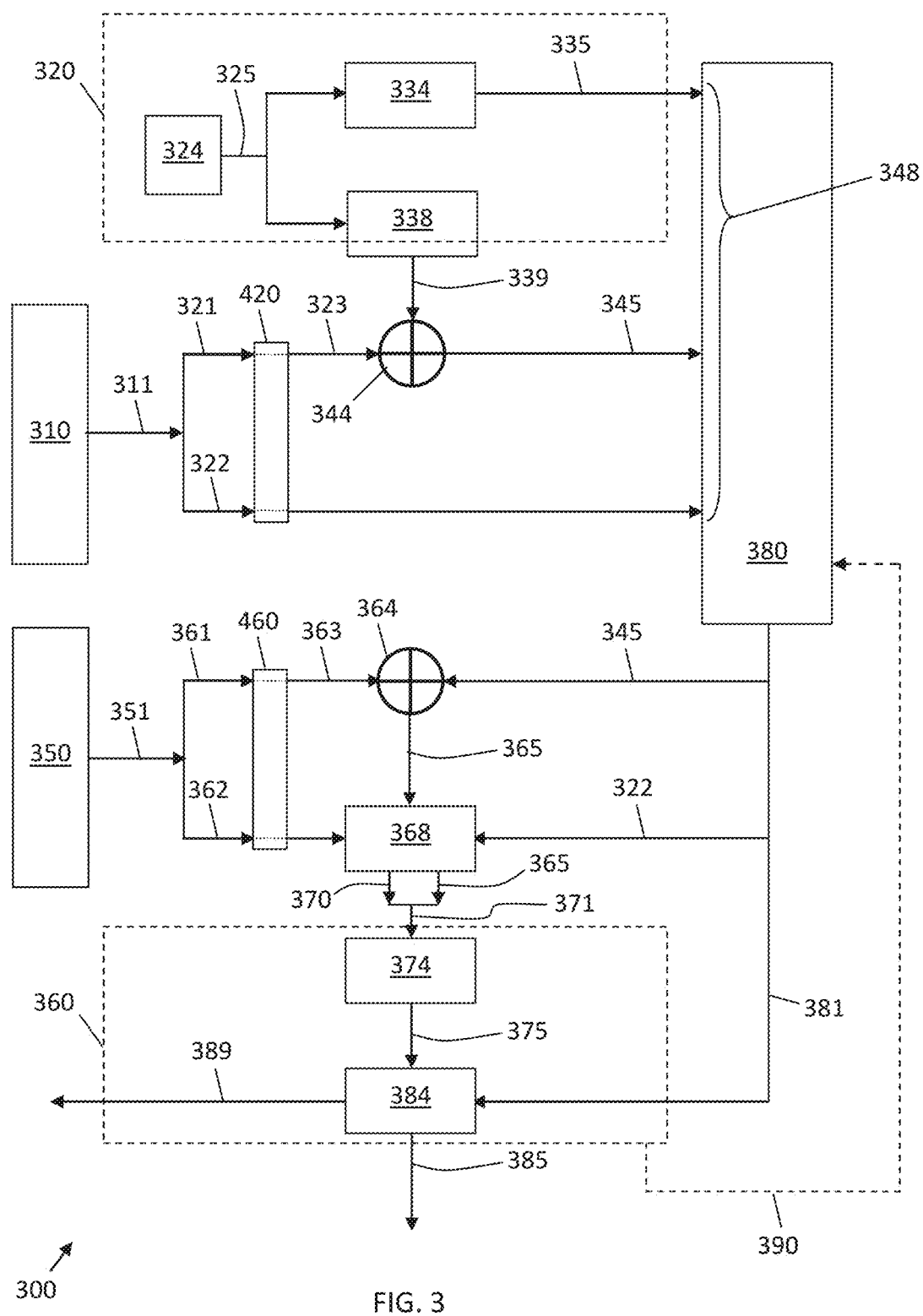
FIG. 3 is a schematic of a system for biometric access according to one or more embodiments.

FIG. 3 illustrates an embodiment of a system 300 for privacy-enhanced biometric access, such as for access to a vehicle. As shown, the system 300 includes a first biometric data receiving device 310 and a second biometric data receiving device 350. Each biometric data receiving device 310 and 350 is suitable for receiving biometric data from a user. An exemplary biometric data receiving device may be a camera, fingerprint reader, iris or retina scanner, or the like. In certain embodiments, a single or same biometric data receiving device may serve as the first biometric data receiving device 310 and second biometric data receiving device 350.

As further shown, the system 300 may include a local user processor 320 provided for communication with the biometric data receiving device 310 to receive biometric data therefrom. Further, the system 300 may include an access control entity 360. Also, the system 300 includes a back office or central processor 380 provided for communication with the local user processor 320.

The exemplary local user processor 320 includes a number generating processing unit 324, a hash function processing unit 334, an encoder processing unit 338, a bitwise operator processing unit 344, and an occlusion processing unit 420. The exemplary access control entity 360 includes an occlusion processing unit 460, a bitwise operator processing unit 364, an erasure handling processor unit 368, a decoder processing unit 374, and an authentication processing unit 384, the use of which are described below.

During an enrollment process, a user provides biometric information to the biometric data receiving device 310. For example, the user may allow his iris to be scanned. As a result, an enrollee biometric template 311, such as an enrollee iris template, is received by the biometric data receiving device 310 and is communicated from the biometric data receiving device 310 to the local user processor 320. As shown, the enrollment biometric template 311 includes "$W_{Bio}$", a first enrollment portion 321, and "$Mask_{Bio}$", a second enrollment portion 322. The first enrollment portion 321 is an encoding of features of the measured object, such as of features of the iris. The second enrollment portion 322 specifies the areas of the first enrollment portion 321 that are not usable, such as due to occlusions and/or light reflection.

For security reasons, the number of occlusions in the enrollment biometric template 311 "$W_{Bio}$" cannot be above a certain threshold. The local user processor 320 rejects the enrollment template if this condition is not met. This condition is meant to prevent someone from enrolling a completely occluded/hidden iris into the system, and then using the issued biometric token to let any iris pass the authentication.

Proceeding with the enrollment process, the first enrollment portion 321 and the second enrollment portion 322 are communicated to the occlusion processing unit 368. Utilizing the second enrollment portion 322, the occlusion processing unit 420 forces the occluded locations of the first enrollment portion 321 to a specific selected value. For example, the occlusion processing unit 420 sets the value at each occluded location to a selected value to create a revised enrollment encoding 323. In certain embodiments, the selected value is zero.

Thereafter, the revised enrollment portion 323, with occluded locations set to the selected value, is communicated to the bitwise operator processing unit 344. In an exemplary embodiment, the bitwise operator processing unit 344 is an exclusive OR (XOR) processing unit.

Parallel to the acquisition of the enrollment biometric template 311, the local user processor 320 generates another signal to be provided to the bitwise operator processing unit 344. As shown, the number generating processing unit 324 generates an enrollment input 325. In an exemplary embodiment, the enrollment input 325 is a random string of bits. An exemplary enrollment input 325 is a random string with a length of 128 bits, though shorter or longer lengths may be used.

The enrollment input 325 is communicated to the hash function processing unit 334. The hash function processing unit 334 converts the enrollment input 325 to "H(m)", a hashed value 335, i.e., a bit string of a fixed size. As shown, the enrollment input 325 is also communicated to the encoder processing unit 338. The encoder processing unit 338 generates "c", an enrollment codeword 339 that is derived from the enrollment input 325.

In an exemplary embodiment, the enrollment codeword "c" is random codeword because the enrollment input to the encoder is randomly chosen. In an exemplary embodiment, the encoder processing unit 338 utilizes an error correcting code. Further, an exemplary encoder processing unit 338 utilizes an error correcting code and an erasure code, such as a Reed-Solomon code. In an additional exemplary embodiment, the error correcting code is a concatenated code that applies two different error correcting codes that specifically encode the output symbols of the outer error correcting code with a second distinct inner error correcting code. For example, the outer code may be a Reed-Solomon code and the inner code may be a Hamming code. In another exemplary embodiment, an interleaver is used to permute the output of the error correcting code so that errors that occur that tend to be localized are spread out over the entire enrollment codeword.

In another exemplary embodiment, the encoder processing unit 338 utilizes a (n,k,d) error and erasure-correcting code. An (n,k,d) error-correction code is a code of length n, rank k, and minimal distance d. In other words, the codewords in the code have length n; and the minimum number of differences between any two codewords in the code is d. In addition to correcting normal errors, the used code also has the capability to correct erasure errors. These are errors the locations of which in the codeword are known. In an exemplary embodiment, the encoder processing unit 338 applies a concatenation of two error correcting codes to the enrollment input. Again, an interleaver may be used to permute the output of the error correcting code so that errors that occur that tend to be localized are spread out over the entire enrollment codeword.

The enrollment codeword 339 is communicated to the bitwise operator processing unit 344. In the exemplary embodiment, the bitwise operator processing unit 344 receives, as inputs, the revised enrollment portion 323 and the enrollment codeword 339 and outputs "rec" as a blinded version of enrollee biometric template first portion 345, wherein $rec = W_{Bio} \oplus c$. The blinded version of enrollee biometric template first portion 345 may be utilized as public recovery data.

Thus, in an enrollment period, hashed value 335 (H(m)), blinded version of enrollee biometric template first portion 345 (rec), and enrollment biometric template second enrollment portion 322 ($Mask_{Bio}$) are collectively communicated from the local user processor 320 to the central processor 380, as a biometric token request 348 associated with a request for access rights by a user. In an exemplary embodiment, the biometric token request 348 is conveyed from the local user processor 320 to the central processor 380 by a cellular network data connection, by the internet, or by a local wireless connection such as Bluetooth Low Energy. The central processor 380 serves as a signing certification authority and generates a signed token 381 from the hashed value 335 (H(m)), blinded version of enrollee biometric template first portion 345 (rec), and enrollment biometric template second enrollment portion 322 ($Mask_{Bio}$). In an exemplary embodiment, the signed token 381 is in the format of:

$$\sigma CA = (W_{Bio}) = Sig_{CA}(H(H(m)), rec, Mask_{Bio}, Metadata).$$

Thus, the system 300 provides for receiving, by the central processor 380, the biometric token request 348 associated with a request for access rights by a user, wherein the biometric token request comprises a hashed value 335 of an enrollment input and a blinded version 345 of a first portion of an enrollee biometric template, generating, by the central processor 380, the signed token 381 from the hashed value 335 and the blinded version 345 of the first portion of the enrollee biometric template. Further, the central processor 380 may generate the signed token 381 from the second portion of the enrollee biometric template specifying parts of the first portion of the enrollee biometric template that are occluded, and from metadata describing conditions for use after access.

The system 300 further provides for authenticating the user or "prover" at a time after enrollment. During an authentication process, the user provides biometric information to the second biometric data receiving device 350 as described above. As a result, an authentication biometric template 351, such as an enrollee iris template, is received by the second biometric data receiving device 350 and is communicated from the second biometric data receiving device 350 to the access control entity 360. An exemplary access control entity 360 is a vehicle. In certain embodiments, the access control entity 360 is a user computing device such as a phone or personal computer. Alternatively, the access control entity 360 may be a common with, or a part of, local user processor 320. As shown, the authentication biometric template 351 includes "$W'_{Bio}$", a first authentication portion 361, and "$Mask'_{Bio}$", a second authentication portion 362. The first authentication portion 361 is an encoding of features of the measured object, such as of features of the iris. The second authentication portion 362 specifies the areas of the first authentication portion 361 that are not usable, such as due to occlusions and/or light reflection.

As shown, the first authentication portion 361 and the second authentication portion 362 are communicated to the occlusion processing unit 460. Utilizing the second authentication portion 362, the occlusion processing unit 460 forces the occluded locations of the first authentication portion 361 to the specific selected value. For example, the occlusion processing unit 460 sets the value at each occluded location to the selected value to create a revised authentication encoding 363. In certain embodiments, the selected value is zero.

Thereafter, the revised authentication encoding 363, with the occluded locations set to the selected value, is communicated to the bitwise operator processing unit 364. In an exemplary embodiment, the bitwise operator processing unit 364 is an exclusive OR (XOR) processing unit. Bitwise operator processing unit 364 also receives the blinded version of enrollee biometric template first portion 345. In an exemplary embodiment, the blinded version of enrollee biometric template first portion 345 is conveyed from the central processor 380 to the bitwise operator processing unit 364 by a cellular network data connection, by the internet, or by a local wireless connection. It is noted that while FIG. 3 illustrates the blinded version of enrollee biometric template first portion 345 being communicated from the central processor 380, the blinded version of enrollee biometric template first portion 345 may reside in the local user processor 320 and/or be communicated from local user processor 320 to bitwise operator processing unit 364, such as by a cellular network data connection, by the internet, or by a local wireless connection.

Bitwise operator processing unit 364 receives, as inputs, revised authentication encoding 363 and the blinded version of enrollee biometric template first portion 345, and outputs (C'), an authentication codeword 365.

In the illustrated embodiment, the authentication codeword 365 may be communicated to the erasure handling processor unit 368. As shown, the erasure handling processor unit 368 also receives "$Mask'_{Bio}$", the authentication biometric template second authentication portion 362, and "$Mask_{Bio}$", the enrollment biometric template second enrollment portion 322. It is noted that while FIG. 3 illustrates the enrollment biometric template second enrollment portion 322 being communicated from the central processor 380, such as by a cellular network data connection, by the internet, or by a local wireless connection, the enrollment biometric template second enrollment portion 322 may reside in the local user processor 320 and/or be communicated from local user processor 320 to the erasure handling processor unit 368, such as by a cellular network data connection, by the internet, or by a local wireless connection.

The erasure handling processor unit 368 evaluates the locations 451 (shown in FIG. 4) of occlusions specified in "$Mask'_{Bio}$", the authentication biometric template second authentication portion 362, and the locations 411 (shown in FIG. 4) of occlusions specified in "$Mask_{Bio}$", the enrollment biometric template second enrollment portion 322, to determine what locations are occluded in the authentication biometric template as indicated in $Mask'_{Bio}$, but are not occluded in the enrollment biometric template as indicated in $Mask_{Bio}$. These locations that are occluded in the authentication biometric template but not in the enrollment biometric template are considered to be erasure errors, and are identified in erasure error information 370. This information 370, along with the authentication code 365, is communicated to decoder processing unit 374 as signal 371. The decoder processing unit 374 decodes the authentication code 365 using a reverse operation as compared to the encoder processing unit 338, optionally making use of the occlusion information 370 generated by erasure handling processing unit 368 to identify the location of erasure errors, and generates m', an authentication input 375.

The authentication input 375 is communicated to a verification processor unit 384. The verification processor unit 384 also receives the signed token 381 and verifies that the user biometric template 351 and the enrollee biometric template 311 match by using m', the authentication input 375, as the input to a hash function identical to the function utilized by hash function processing unit 334, and comparing the output of the hash function with the hashed value 335 in the biometric token. If the hash function output is identical to the hashed value 335 and the signature on the signed biometric token 348 is valid, then the user biometric template 351 and the enrollee biometric template 311 are considered to match; otherwise the templates are considered not to match.

When the user biometric template 311 and the enrollee biometric template 351 match, the verification processor unit 384 may issue an authorization notice 385 to allow the user access to the access control entity. If the user biometric template 311 and the enrollee biometric template 351 do not match, then a non-authorization notice 389 may be issued by the verification processor unit 384. As shown, the access control entity 360 may save a record 390 of each instance a user is authenticated and/or communicate a record 390 to the central processor 380.

Figure 4:
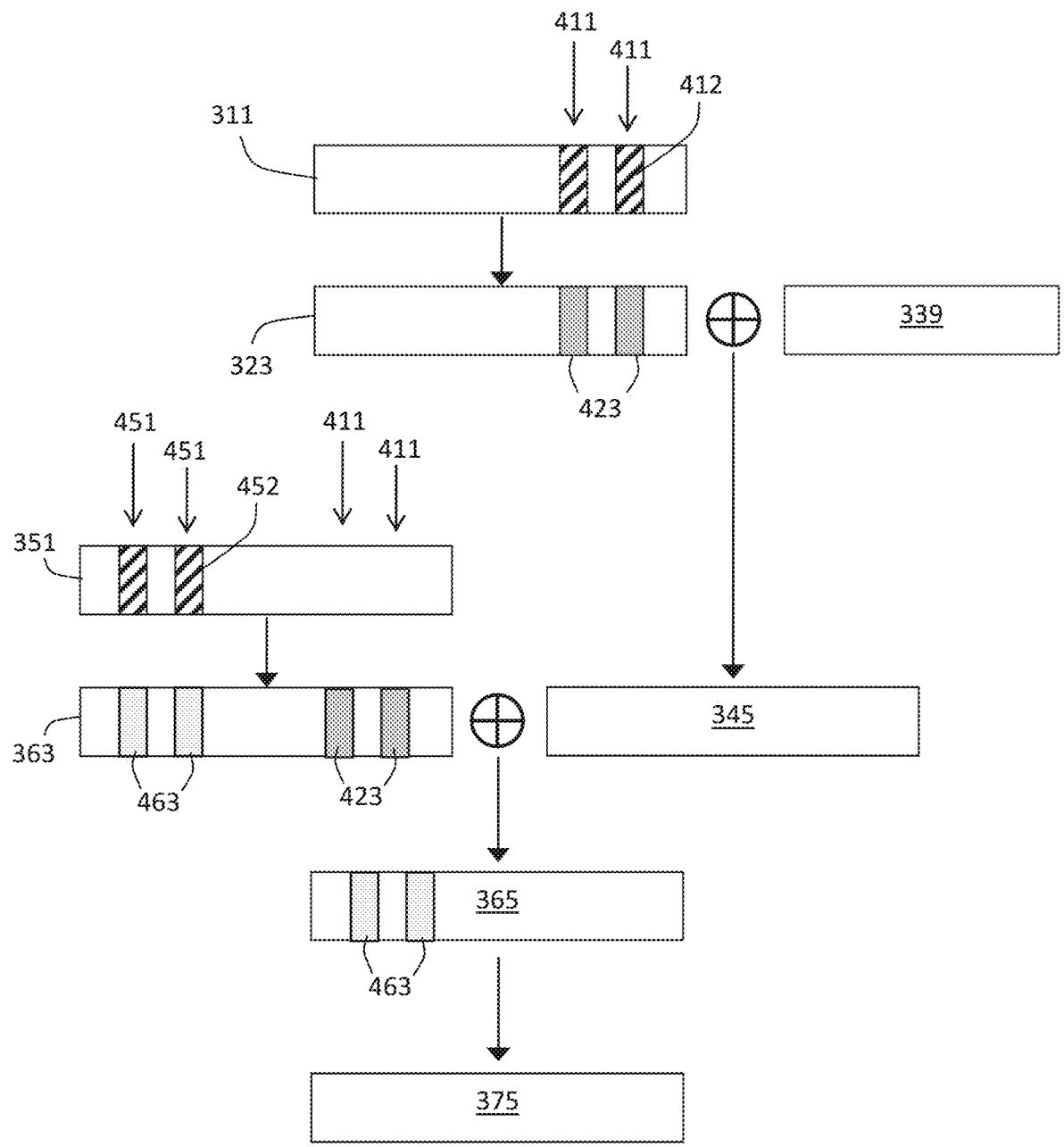
FIG. 4 is a schematic of an authentication method according to one or more embodiments.

FIG. 4 illustrates an authentication method for handling occluded data. In FIG. 4, enrollment data 311 is received and includes portions or locations 411 that are not usable, e.g., that include occlusions 412. Enrollment data 311 may be considered to be an enrollment template including a first portion of an encoding of features of the measured object and a second enrollment portion specifying locations 411 that are not usable.

As shown, the enrollment data 311 is revised by setting values at the locations 411 to a selected value 423 to form a revised enrollment template portion 323. In an exemplary embodiment, the selected value 423 is zero.

The revised enrollment encoding 323 is processed with an enrollment codeword 339 to create a blinded enrollment encoding as recovery data 345. For example, the revised enrollment encoding 323 and enrollment codeword 339 may be exclusive OR'ed (XOR'ed) to generate the recovery data 345.

As further shown, authentication data 351 that includes portions or locations 451 that are not usable, e.g., that include occlusions 452. As shown, authentication data 351 need not include occlusions at locations 411. In other embodiments, authentication data 351 may include occlusions at locations 411. Authentication data 351 may be considered to be an authentication template including a first portion of an encoding of features of the measured object and a second enrollment portion specifying locations 451 that are not usable.

As shown, the authentication data 351 is revised by setting values at the locations 451 to a selected value 463 to form a revised authentication template portion 363. In an exemplary embodiment, the selected value 463 is zero. As shown, the locations 411 may also be set to the selected value 423, corresponding to the revised enrollment encoding 323.

The revised authentication encoding 363 is processed with the recovery data 345 to create an authentication codeword 365. For example, the revised authentication encoding 363 and the recovery data 345 may be exclusive OR'ed (XOR'ed) to generate the authentication codeword 365.

Thereafter, the authentication codeword 365 may be processed, such as by an erasure handling unit. It is noted that, in FIG. 4, the authentication data 351 includes occlusions 452 at locations 451 but not at locations 411, where the enrollment data 311 includes occlusions 412. In other words, locations 451 do not overlap with or include any of locations 411 (as noted above, this need not be the case). The erasure handling unit will consider any locations 451 that do not overlap with locations 411 to be erasure errors included in erasure information 370, as noted above in relation to FIG. 3, and include the erasure information 370 and the authentication codeword 365 in a signal 371.

As described in relation to FIG. 3, the authentication codeword 365 and the erasure error information 370 are communicated to the decoder 374 as signal 371. The decoder 374 uses, among other inputs, the location of erasure errors to process the authentication codeword 365 to compute a corrected authentication codeword 375. The corrected authentication codeword 375 may be further processed according to FIG. 3 to authenticate a user.

It is noted that for any enrollment or authentication biometric templates, an unpredictable set of regions or locations can be occluded. In a particular template there may be no occlusions at all, or several non-adjacent regions of various sizes each of which can be occluded. The process described herein handles such varying conditions in a same manner. For both enrollment and authentication, the captured images are first converted to a template (a standardized representation of the geometry of the image that is scaled such that it is size independent). The set of locations in the template that are occluded is determined and then processed appropriately.

Because the enrollment biometric and the authentication biometric template are independent, there can be locations that are occluded in neither template, locations that are only occluded in the enrollment template, locations that are only occluded in the authentication template, and locations that are occluded in both templates. Each of these cases is treated separately by the method described herein.

When an authentication image of the iris is taken and converted into a template, the location of occlusions are independently determined. All locations that are occluded in the authentication template are set to a specified value (such as zero). Locations of the authentication template that are occluded in corresponding locations in the enrollment template are also set to the same specified value. Thus, if there is no occlusion at a specific location in either template the original value remains unchanged. If there is an occlusion at a location only in the enrollment template, then the authentication template is set to the specified value at that location and no further action is taken. If there are occlusions at a same location in both the enrollment template and the authentication template, then the authentication template is set to the specified value and no further action is taken. If there is an occlusion at a location in the authentication template but not in the corresponding location in the enrollment template, then the authentication template is set to the specified value and, in addition, the erasure code is notified that an error definitely occurs at this position.

As described herein, methods, systems and computer readable storage medium for authentication and privacy-enhanced biometric access are provided. In the methods and systems described, biometric authentication is provided without requiring the enrollee to send his biometric information to a central processor, or to store a copy of his enrollment biometric or any biometric token on a local device such as a phone. Further, in the methods and systems described, the enrollee does not need to communicate anything to the authenticating device other than providing biometric data, such as by displaying his iris. Further, embodiments of the scheme described herein are capable of overcoming issues presented by occlusions, such as those caused by eyelids covering portions of the iris or specular reflections, that are prevalent in iris-based authentication.

In applications of the methods and systems described herein, a user may provide authentication data to a vehicle and the vehicle may relay information authentication data to a central processor where an authorization decision, i.e., the decision whether to grant access and use to the user, may be performed. The central processor may communicate an authorization token to the vehicle and may log information related to the authentication data and grant of access In another application, a user may obtain access to enter and use a vehicle as described above while a vehicle owner retains the ability to revoke access. For example, the vehicle owner may have the ability to communicate to the central processor to revoke access. Such an application may be used during peer-to-peer car sharing or for valet access.

For a delivery application, a delivery employee may provide biometric data to enroll. In response, the central processor, e.g., a back office service, may send an authorization token to the vehicle such that the delivery employee is granted access to enter, but not start, the vehicle. Such access may be limited to the trunk of the vehicle. Further, the back office server may issue the authorization token when approved by the owner of the vehicle.

While at least one exemplary aspect has been presented in the foregoing detailed description, it should be appreciated that a vast number of variations exist. It should also be appreciated that the exemplary aspect or exemplary aspects are only examples, and are not intended to limit the scope, applicability, or configuration of the claimed subject matter in any way. Rather, the foregoing detailed description will provide those skilled in the art with a convenient road map for implementing an exemplary aspect of the subject matter. It being understood that various changes may be made in the function and arrangement of elements described in an exemplary aspect without departing from the scope of the subject matter as set forth in the appended claims.

What is claimed is:

1. An authentication method comprising:
    obtaining an enrollment input of features from a user;
    identifying a first location in the enrollment input that is not usable;
    setting a value at the first location to a selected value to create a revised enrollment encoding;
    processing the revised enrollment encoding and an enrollment codeword to create a blinded enrollment encoding as public recovery data;
    obtaining from an authentication template a first template portion, including an encoding of features, and a second template portion, including an identification of a second location in the first template portion that is not usable, wherein at least a portion of the second location does not overlap with the first location;
    revising the first template portion by setting a value at the first location and at the second location to a selected value to form a revised first template portion;
    creating an authentication codeword from the revised first template portion and from the public recovery data;
    performing an error correction process to generate a corrected authentication codeword from the authentication codeword and from the second template portion; and
    decoding the corrected authentication codeword.

2. The authentication method of claim 1 wherein decoding the corrected authentication codeword generates an authentication input.

3. The authentication method of claim 2 wherein the public recovery data is generated from the enrollment input, wherein the enrollment input is converted by a hash function to an enrollment hashed value, and wherein the method further comprises inputting the authentication input to the hash function to convert the authentication input to an authentication hashed value.

4. The authentication method of claim 3 further comprising comparing the authentication hashed value to the enrollment hashed value.

5. The authentication method of claim 4 further comprising authenticating a user when the authentication hashed value is identical to the enrollment hashed value.

6. The authentication method of claim 5 further comprising communicating and/or recording a record of each instance a user is authenticated.

7. The authentication method of claim 1 wherein creating the authentication codeword from the revised first template portion and from the public recovery data comprises processing the revised authentication encoding and the recovery data with a bitwise operator processing unit.

8. The authentication method of claim 1 wherein creating the authentication codeword from the revised first template portion and from the public recovery data comprises processing the revised authentication encoding and the recovery data with an exclusive OR (XOR) processing unit.

9. The authentication method of claim 1 wherein the second location is occluded.

10. The authentication method of claim 1 wherein revising the first template portion by setting the value at the first location and at the second location to the selected value to form the revised first template portion comprises setting the value at the first location and at the second location to zero.

11. An authentication method comprising:
    obtaining an enrollment encoding of features from a user, wherein the enrollment encoding includes a first set of occlusions at a first set of locations;
    setting a value at the first set of locations to a selected value to create a revised enrollment encoding;
    processing the revised enrollment encoding and an enrollment codeword to create a blinded enrollment encoding as recovery data;
    obtaining an authentication encoding of features from the user, wherein the authentication encoding includes the first set of locations and includes a second set of occlusions at a second set of locations, wherein at least a portion of the second set of locations does not overlap with the first set of locations;
    setting the value at the first set of locations and the value at the second set of locations of the authentication encoding to the selected value to create a revised authentication encoding;
    processing the revised authentication encoding and the recovery data to create an authentication codeword; and
    comparing the authentication codeword and the enrollment codeword to authenticate the user.

12. The authentication method of claim 11 further comprising creating the enrollment codeword by encoding an enrollment input.

13. The authentication method of claim 12 further comprising entering the enrollment input in a hash function and converting the enrollment input to an enrollment hashed value.

14. The authentication method of claim 13 wherein comparing the authentication codeword and the enrollment codeword to authenticate the user comprises:
    decoding the authentication codeword to generate an authentication input;
    entering the authentication input in the hash function and converting the authentication input to an authentication hashed value; and
    authenticating the user when the authentication hashed value is identical to the enrollment hashed value.

15. The authentication method of claim 11 wherein:
    processing the revised enrollment encoding and the enrollment codeword to create the blinded enrollment encoding as recovery data comprises processing the revised enrollment encoding and the enrollment codeword with a first bitwise operator processing unit; and
    processing the revised authentication encoding and the recovery data to create the authentication codeword comprises processing the revised authentication encoding and the recovery data to create the authentication codeword with a second bitwise operator processing unit.

16. The authentication method of claim 11 wherein:
    processing the revised enrollment encoding and the enrollment codeword to create the blinded enrollment encoding as recovery data comprises processing the revised enrollment encoding and the enrollment codeword with a first exclusive OR (XOR) processing unit; and processing the revised authentication encoding and the recovery data to create the authentication codeword comprises processing the revised authentication encoding and the recovery data to create the authentication codeword with a second exclusive OR (XOR) processing unit.

17. The authentication method of claim 11 wherein setting the value at the first set of locations and the value at the second set of locations of the authentication encoding to the selected value to create the revised authentication encoding comprises setting the value at the first set of locations and the value at the second set of locations to zero.

18. The authentication method of claim 11 wherein at least one location is included in both the first set of locations and in the second set of locations.

19. The authentication method of claim 11 further comprising communicating and/or recording a record of each authentication of the user.

20. A non-transitory computer readable storage medium having program instructions embodied therewith, the program instructions readable by a processor to cause the processor to perform a method for authenticating a user comprising:

obtaining an enrollment encoding of features from a user, wherein the enrollment encoding includes a first occlusion at a first location;

setting a value at the first location to a selected value to create a revised enrollment encoding;

processing the revised enrollment encoding and an enrollment codeword to create a blinded enrollment encoding as recovery data;

receiving an authentication input associated with the user, wherein the authentication input comprises a first template portion, including an encoding of features, and a second template portion, including an identification of a second location in the first template portion that is not usable, wherein at least a portion of the second location does not overlap with the first location;

revising the first template portion by setting a value at the first location and at the second location to a selected value to form a revised first template portion;

creating an authentication codeword from the revised first template portion and from public recovery data;

performing an error correction process to generate a corrected authentication codeword from the authentication codeword and from the second template portion; and decoding the corrected authentication codeword.

* * * * *